Aug. 18, 1970    P. MUNDT ET AL    3,524,299

PROCESS AND APPARATUS FOR MOUNTING TRANSPARENCIES

Filed Feb. 27, 1967    3 Sheets-Sheet 1

INVENTORS
PETER MUNDT,
OTFRIED URBAN,
ARNOLD NEUHOLD

BY *Stevens, Davis, Miller & Mosher*
ATTORNEYS

Aug. 18, 1970      P. MUNDT ET AL      3,524,299
PROCESS AND APPARATUS FOR MOUNTING TRANSPARENCIES
Filed Feb. 27, 1967      3 Sheets-Sheet 2

INVENTORS
PETER MUNDT,
OTFRIED URBAN,
ARNOLD NEUHOLD
BY
*Stevens, Davis, Miller & Mosher*
ATTORNEYS

# United States Patent Office 3,524,299
Patented Aug. 18, 1970

3,524,299
PROCESS AND APPARATUS FOR
MOUNTING TRANSPARENCIES
Peter Mundt, Garmisch-Partenkirchen, Otfried Urban,
Kochel am See, and Arnold Neuhold, Garmisch-
Partenkirchen, Germany, assignors to Geimuplast Peter
Mundt KG, Garmisch-Partenkirchen, Germany
Filed Feb. 27, 1967, Ser. No. 618,684
Claims priority, application Germany, Mar. 4, 1966,
G 46,226
Int. Cl. B31b 1/20, 1/82; B65b 17/00
U.S. Cl. 53—23                                     3 Claims

ABSTRACT OF THE DISCLOSURE

The leading end of a film strip is inserted in successive steps into respective frames and a transparency is severed from the film strip between successive inserting steps. The transparency is fully inserted into the frame in the severing station. A movable gripper grips the severed transparency through the picture aperture of the frame and fully pulls the transparency into the frame.

---

Figure 1:
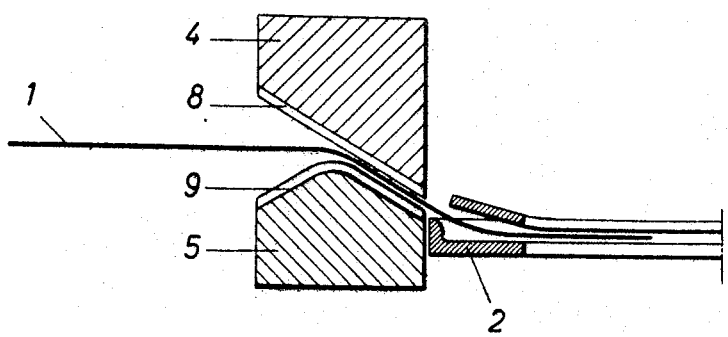

This invention relates to a method and appartus for manually or automatically inserting transparencies into frames ready for use, wherein the leading end of the film strip is inserted in successive steps into respective frames and a transparency is severed from the film strip between successive inserting steps.

In most devices of this kind, the frames consist of two parts, which are assembled within the device to form a frame ready for use. This assembling of the frame parts is not effected until the transparency severed from the film strip has been placed into one part of the frame. Such devices are expensive.

Other devices are known in which the transparency can be inserted into a frame which is ready for use. While the transparency is still connected to the film strip, the transparency is partly inserted into the frame trrough a threading slit and is then severed from the film strip. The frame and the partly inserted transparency are now moved in a direction which is at right angles to the direction of movement of the film strip and are thus moved into a second station, where the transparency is completely inserted into the frame by a thin sliding tongue, which moves parallel to the film strip. The finished frame is then ejected from the device.

This known process and the device designed to carry it out have disadvantages too. In practice, the film strips leaving the drying cabinet may have a transverse camber, which means that they have been three-dimensionally deformed. When such film strips are introduced into the narrow threading slit of a transparency frame which is ready for use, the picture may become scratched. As the film strip which has been partly inserted into the frame has still its transverse camber, which continues in a longitudinal direction, the film strip will inevitably engage the frame portion which defines the rear edge of the picture aperture when the film strip is fully inserted into the frame. The transparency may also become damaged or destroyed if an excessively high resistance is encountered by the film being inserted into the frame. This may occur particularly when the perforations or other portions of the film have been damaged or the film has been spliced.

It is an object of the invention to simplify the last-mentioned process and to eliminate the disadvantages which have been pointed out. In a process of the kind described last, this object is accomplished by the invention in that the transparency is fully inserted into the frame in the severing station. In a desirable development of the invention, the frame is expanded in the severing station.

The process according to the invention has the advantage that stresses on the transparency are avoided to a large extent so that scratches cannot be formed. It will be understood that this danger cannot be entirely eliminated if the transparency must be moved while its picture-bearing portion is clamped in the threading slit. Compared to the prior art, the invention eliminates also the step of moving the frame from the severing station into the station in which the transparency was previously inserted entirely into the frame.

The mechanical mounting of transparencies has always involved difficulties if the transparency is cambered out of the feeding plane and such camber cannot always be avoided for the reasons mentioned above. Besides, the known devices are not suitable to mount transparencies in frames which have no threading slit at an end. In a further development of the invention, both disadvantages are eliminated in that the film strip is deflected into a different plane before it is inserted into the frame. The deflection of the film strip constrains the same to assume a planar position. Besides, the film strip can be introduced over the end edge of one frame part between the latter and a cover part of the frame.

The invention relates also to a process in which the cycle consisting of the partial insertion, severing and complete insertion of the transparency is interrupted when the transparency encounters a resistance which involves a danger of damage to or destruction of the transparency, said interruption having the effect that the initiated cycle is completed in an idle manner and a new cycle cannot be initiated. This ensures a desirable protection of the film so that there will be no loss of transparencies, which may be precious to the customer.

The invention provides further an apparatus for carrying out a process of the last-mentioned kind. According to the invention, this device is characterized by a movable gripper, which grips the severed transparency through the picture aperture of the frame and fully pulls the transparency into the frame. Such apparatus can be made in a simpler manner and with less expense than the known apparatus comprising two working stations described hereinbefore.

In a further embodiment of the invention, the device is characterized in that the gripping faces of the jaws of the gripper are adjusted to lie exactly in the plane in which the transparency can be fully inserted into the frame without disturbance. In this way it is not necessary to provide a concave cut, which is necessary in the prior art to avoid an engagement of cambered films with the frame part defining the rear edge of the picture aperture.

The process of protecting the film may be carried out according to the invention on an apparatus which comprises grippers, which extend into the perforations of the transparency and are pivotally movable outwardly about an axis and reciprocable by the length of a transparency, to lateral pressure bars, which are pivoted on a rear axis and slidable each on a guide bar and under the action of a tension spring acting upwardly and in the feeding direction, said pressure bars being movable to a forward position, in which they are held in a groove of the guide bars and force the transparency against a film guide, and a switch, which is operable by a pressure bar which has been moved out of the horizontal position.

Figure 2:
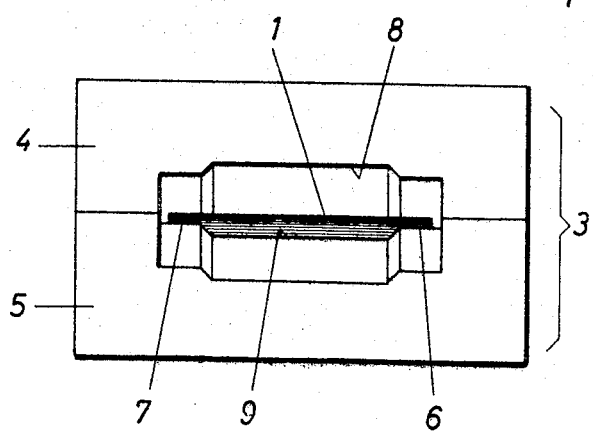
Figure 3:
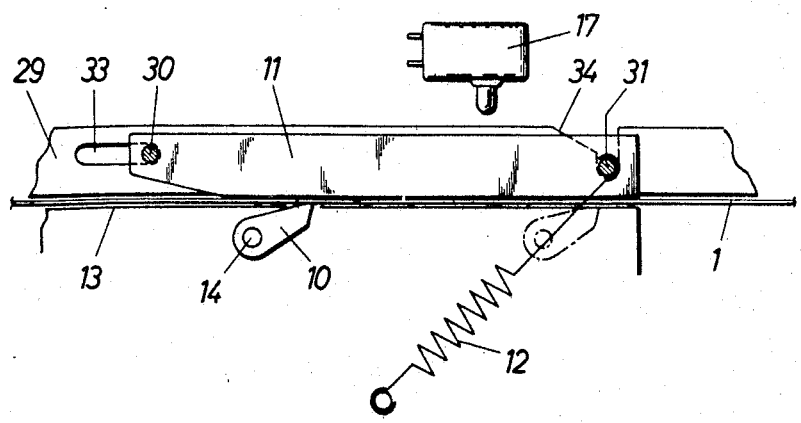
Figure 4:
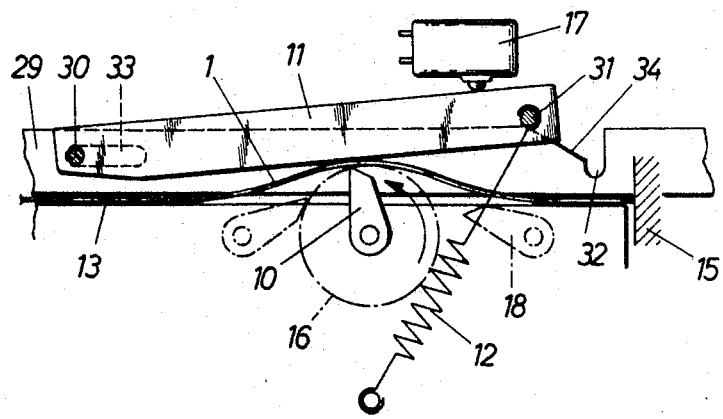
Figure 5:
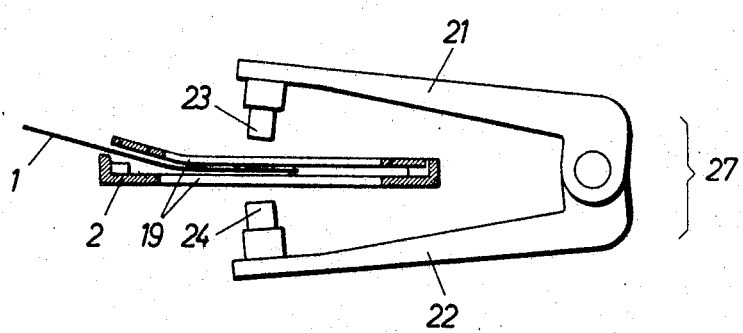
Figure 6:
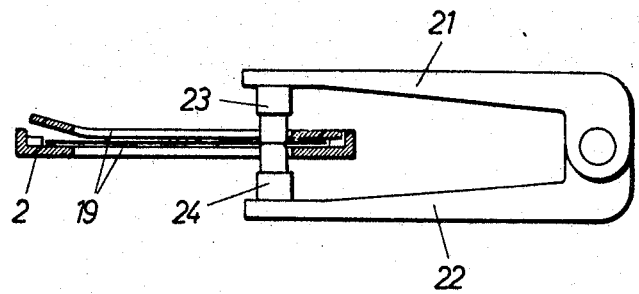

An embodiment of the invention will be described hereinafter by way of example with reference to the drawing, in which:

FIG. 1 illustrates the deflection of the film strip from one plane into the other, FIG. 2 is a view in the direction of the film feeding direction at an angle of 90° from that of FIG. 1, FIG. 3 an elevation of the device for protecting the film in normal operation, FIG. 4 shows the situation arising when a resistance is encountered, FIG. 5 illustrates the gripper according to the invention in position of rest, and FIG. 6 depicts the gripper in the final position of its working movement.

Immediately before the frame 2, the film strip 1 is moved through a deflecting device 3, which comprises essentially the guides 4, 5, which are vertically aligned and impart to the film strip a camber throughout its width before the film strip is threaded into the frame. This will entirely eliminate any longitudinal camber of the film strip. During this deflecting operation, the film strip 1 is guided only at its edge portions 6, 7 so that the picture on the film is protected by the recesses 8 and 9 from being scratched. In the embodiment shown by way of example, the film strip 1 is introduced into the device 3 on a higher level and is then downwardly deflected and moved out of the device and partly into the expanded frame 2 on a plane which is lower than the plane in which the film is received by the device 3.

As is apparent from FIGS. 3 and 4, grippers 10 are provided for carrying the film strip 1 through the deflecting device 3 and into the frame 2. These grippers feed the film strip 1 by steps corresponding to one film frame length. Two lateral pressure bars 11 are slidable each on a guide bar 29 and are pivoted on a rear axis 30 and under the action of a tension spring 12, which extends obliquely upwardly and in the feeding direction. By these pressure strips 11, the film strip 1 is urged against the film guide 13. In their forward position, the pressure bars 11 are held by a bolt 31 in a groove 32 of the guide strips 29. Longitudinal slots 33 enable a sliding movement of the pressure bars 11 on the guide bars 29.

When the film strip 1 encounters an obstacle in the film guide 13 or during the threading into the frame 2, which obstacles might cause damage to or a destruction of the film, the carriage to which the grippers 10 are pivoted on an axis 14 continues to advance in the feeding direction. As the film strip 1 whose perforations receive the grippers 10 is stopped, the grippers 10 perform a pivoted movement according to an arc of a circle 16 so that the pressure bars 11 are urged upwardly against the stress of the tension spring 12. This is shown in FIG. 4. A switch 17 is then operated by which the cycle consisting of the partial insertion, severing and complete insertion of the transparency is interrupted in such a manner that the initiated cycle is completed without a feeding movement of the film strip 1 and a new cycle cannot be initiated. As a result, the film strip can never be damaged and a new cycle can be readily initiated when the obstacle to the continued feeding of the film strip has been removed. Because the grippers 10 are pivoted to the position 18 shown in FIG. 4, the carriage mounting the pivot 14 for the grippers 10 can return to its initial position without obstruction by the perforations of the film strip and without damage to the film.

In the position shown in FIG. 1, the transparency is severed in known manner from the film strip 1 and subsequently assumes the position shown in FIG. 5. A gripper 27 is disposed over the picture aperture 19 of the frame 2 and comprises two jaws 21, 22, which are provided at their forward ends with two rubber-covered gripping faces 23, 24.

As soon as the transparency has been severed from the film strip 1, the jaws 21, 22 are approached to each other so that the gripping faces 23, 24 are moved into the picture aperture 19 of the frame 2 and grip the transparency from above and below. The gripper 27 is then moved in the direction of the arrow 25 in FIG. 5 in the feeding path of the film strip 1 to the position which is shown in FIG. 6. It is clearly apparent from FIG. 6 how the gripper 27 has completely pulled the transparency into the frame 2 so that the transparency is in position for projection.

The gripper is then opened. The finished frame 2 is ejected from the apparatus at right angles to the feeding direction of the film strip 1 and the gripper 27 is returned in the direction of the arrow 26 in FIG. 6 into the initial position shown in FIG. 5.

It is clearly apparent from FIG. 6 that the gripping faces 23, 24 of the jaws 21, 22 of the gripper 27 are adjusted to lie exactly in the plane in which the transparency can be fully inserted into the frame without any disturbance. For this reason, the transparency need not be provided with a concave cut which is required in the prior art owing to the transverse camber of each film in order to prevent an engagement with the frame portion defining the rear edge of the picture aperture.

What is claimed is:

1. A method for severing a transparency from a film strip and for mounting same in a frame having a slot through which said transparency may be introduced into said frame and comprising the steps of: expanding the frame in a severing station to widen said slot; introducing the transparency into the frame through the thus-widened slot at the severing station so as to reduce the possibility of marring the surface of the transparency during introduction thereof into the frame, the transparency is partially introduced into the frame in such a manner that while in the frame it slides in a longitudinal plane of the frame; severing the transparency from the film strip at the severing station; completing the insertion of the transparency into said frame at the severing station; and subsequently releasing the frame for return to its unstressed condition so that the thus-introduced transparency remains mounted in the frame.

2. A method according to claim 1 characterized in that the film strip is deflected into a plane other than said longitudinal plane of the frame before it is introduced into the frame, the deflection of the film constraining the same to assume a planar position and allowing the film strip to be introduced over an edge of a frame part between the latter and a cover part of the frame.

3. A method according to claim 1 characterized in that the cycle consisting of the partial introduction, severing and complete introduction of the transparency is interrupted when the transparency encounters a resistance which involves a danger of damage to, or destruction of the transparency, said interruption having the effect that the initiated cycle is completed in an idle manner and a new cycle cannot be initiated.

References Cited

UNITED STATES PATENTS

| 2,725,155 | 11/1955 | Fitch | 53—123 X |
|---|---|---|---|
| 3,067,805 | 12/1962 | Flynn | 53—123 X |
| 3,271,218 | 9/1966 | Ott | 156—108 |
| 3,274,665 | 9/1966 | Higginson. | |
| 3,359,150 | 12/1967 | Stoothoff | 156—514 X |
| 3,429,101 | 2/1969 | Anderson | 53—123 X |
| 2,690,021 | 9/1954 | Langan | 156—108 X |
| 3,013,354 | 12/1961 | Wiklund | 156—108 X |
| 3,141,275 | 7/1964 | Anderson | 53—23 X |
| 3,141,276 | 7/1964 | Anderson | 53—23 X |
| 3,248,846 | 5/1966 | Engelstein | 53—23 X |
| 3,310,450 | 3/1967 | Dedona. | |
| 3,369,338 | 2/1968 | Koeppe | 53—35 |

FOREIGN PATENTS 871,349   6/1961   Great Britain.

WAYNE A. MORSE, Jr., Primary Examiner

U.S. Cl. X.R.

53—50, 123; 93—61